(12) United States Patent
Tanaka et al.

(10) Patent No.: US 12,550,037 B2
(45) Date of Patent: Feb. 10, 2026

(54) OPTICAL PATH DESIGN APPARATUS, OPTICAL PATH DESIGN METHOD AND PROGRAM

(71) Applicant: NTT, Inc., Tokyo (JP)

(72) Inventors: Takafumi Tanaka, Musashino (JP); Takuya Ohara, Musashino (JP); Fumikazu Inuzuka, Musashino (JP); Takuya Oda, Musashino (JP); Masayuki Shimoda, Musashino (JP)

(73) Assignee: NTT, Inc., Tokyo (JP)

( * ) Notice: Subject to any disclaimer, the term of this patent is extended or adjusted under 35 U.S.C. 154(b) by 508 days.

(21) Appl. No.: 18/029,722

(22) PCT Filed: Oct. 22, 2020

(86) PCT No.: PCT/JP2020/039682
§ 371 (c)(1),
(2) Date: Mar. 31, 2023

(87) PCT Pub. No.: WO2022/085147
PCT Pub. Date: Apr. 28, 2022

(65) Prior Publication Data
US 2023/0232307 A1 Jul. 20, 2023

(51) Int. Cl.
*H04W 40/04* (2009.01)
*H04B 10/114* (2013.01)
*H04W 72/0446* (2023.01)

(52) U.S. Cl.
CPC .......... *H04W 40/04* (2013.01); *H04B 10/114* (2013.01); *H04W 72/0446* (2013.01)

(58) Field of Classification Search
CPC . H04W 40/04; H04W 72/0446; H04B 10/114
See application file for complete search history.

(56) References Cited

U.S. PATENT DOCUMENTS 6,678,524 B1 1/2004 Hansson et al.
6,914,972 B1 7/2005 Baumeister et al.
(Continued)

FOREIGN PATENT DOCUMENTS

EP 3041311 7/2016
JP A-10-117215 5/1998
(Continued)

OTHER PUBLICATIONS

Varsha Lohani, Routing, Modulation and Spectrum Assignment using an AI based Algorithm, 2019, International Conference on Communication Systems & Networks, All Pages (Year: 2019).*

(Continued)

*Primary Examiner* — Pranesh K Barua
(74) *Attorney, Agent, or Firm* — Fish & Richardson P.C.

(57) ABSTRACT

An optical path design device includes: a search unit configured to search for one or more route possibilities from a start point to an end point in an optical network including one or more transmission paths as links and a plurality of node devices as nodes on the basis of topology information of the optical network, information on the start point, and information on the end point; a time derivation unit configured to derive available time which is time at which a frequency band including one or more frequency slots becomes available for communication for each of the transmission paths or the node devices included in the route; and a design unit configured to select the route from the one or more route possibilities that have been searched for on the basis of the available time derived for each of the transmission paths or the node devices and select a frequency band of an optical signal to be transmitted through an optical path in the selected route.

18 Claims, 11 Drawing Sheets

(56) References Cited

U.S. PATENT DOCUMENTS

| | | | |
|---|---|---|---|
| 7,519,049 B2 | 4/2009 | Masuda | |
| 7,822,065 B2 | 10/2010 | Lu | |
| 8,719,534 B1 | 5/2014 | Ray, III et al. | |
| 9,141,420 B2 | 9/2015 | Chang et al. | |
| 9,146,769 B1 | 9/2015 | Shankar et al. | |
| 9,785,478 B1 | 10/2017 | Babu B R et al. | |
| 10,211,923 B2 * | 2/2019 | Takeshita | H04L 12/44 |
| 11,089,105 B1 | 8/2021 | Karumbunathan et al. | |
| 11,301,407 B2 | 4/2022 | Sen et al. | |
| 2003/0184651 A1 | 10/2003 | Ohsawa et al. | |
| 2006/0171713 A1 | 8/2006 | Feng | |
| 2007/0079307 A1 | 4/2007 | Dhawan et al. | |
| 2008/0056717 A1 * | 3/2008 | Niven-Jenkins | H04J 14/0241 398/57 |
| 2008/0235361 A1 | 9/2008 | Crosbie et al. | |
| 2009/0240790 A1 | 9/2009 | Utsunomiya et al. | |
| 2010/0042636 A1 | 2/2010 | Lu | |
| 2011/0126047 A1 | 5/2011 | Anderson et al. | |
| 2012/0117563 A1 | 5/2012 | Chang et al. | |
| 2012/0327953 A1 | 12/2012 | Vokkarane et al. | |
| 2013/0262390 A1 | 10/2013 | Kumarasamy et al. | |
| 2014/0019621 A1 | 1/2014 | Khan et al. | |
| 2014/0181984 A1 | 6/2014 | Kundu et al. | |
| 2014/0258533 A1 | 9/2014 | Antony | |
| 2015/0363219 A1 | 12/2015 | Katsuri et al. | |
| 2017/0235817 A1 | 8/2017 | Deodhar et al. | |
| 2018/0191601 A1 | 7/2018 | Micallef | |
| 2019/0042325 A1 | 2/2019 | Nair | |
| 2019/0260474 A1 * | 8/2019 | Takeshita | H04J 14/0267 |
| 2019/0327144 A1 | 10/2019 | Tembey et al. | |
| 2019/0339320 A1 | 11/2019 | Dzafic | |
| 2020/0136743 A1 * | 4/2020 | Fujisawa | H04Q 11/0062 |
| 2020/0218684 A1 | 7/2020 | Sen et al. | |
| 2020/0412657 A1 | 12/2020 | Jang et al. | |
| 2022/0029701 A1 * | 1/2022 | Chhillar | H04B 10/03 |
| 2022/0158756 A1 | 5/2022 | Wang et al. | |

FOREIGN PATENT DOCUMENTS

| | | |
|---|---|---|
| JP | A-2003-535526 | 11/2003 |
| JP | A-2005-064970 | 3/2005 |
| JP | A-2006-527541 | 11/2006 |
| JP | A-2010-521761 | 6/2010 |
| JP | A-2012-505561 | 3/2012 |
| JP | A-2015-065527 | 4/2015 |
| JP | A-2015-527649 | 9/2015 |
| KR | 10-2014-0003200 A | 1/2014 |
| WO | WO 01/93607 A1 | 12/2001 |
| WO | WO 2004/111775 A2 | 12/2004 |
| WO | WO 2010/041582 A1 | 4/2010 |
| WO | WO 2015/029416 | 3/2015 |
| WO | WO 2020/143380 | 7/2020 |

OTHER PUBLICATIONS

Jinno et al., "Virtualization in Optical Networks from Network Level to Hardware Level [Invited]," J. Opt. Commun. Netw., Oct. 2013, 5(10):A46-A56.

ATEN International Co., Ltd., "KE6920 datasheet," ver. 01, Jun. 17, 2020, retrieved from URL <https://assets.aten.com/product/spec_sheet/JP/ke6920-6922_ver01j.pdf>, ATEN Product Information KE6920, pp. 1-5 (No Translation).

Bijoy Chand Chatterjee et al., "Routing and Wavelength Assignment for WDM-based Optical Networks," Springer, pp. 35-43, vol. 410, 2017.

International Search Report in International Appln. No. PCT/JP2020/036303, dated Feb. 2, 2021, 6 pages (with English Translation).

International Search Report in International Appln. No. PCT/JP2020/039655, dated Feb. 16, 2021, 6 pages (with English Translation).

K. Yamaguchi et al., "MxN Wavelength Selective Switches Using Beam Splitting By Space Light Modulators," IEEE Photonics Journal, vol. 8, No. 1, Feb. 2016.

M. Jinno et al., "An Overview of Elastic Optical Networks," Proceedings of the 2013 IEICE Communications Society Conference, 2013, p. SS-98-SS-99 (No Translation).

Pegah Afsharlar et al., "Routing and Spectrum Assignment with Delayed Allocation in Elastic Optical Networks," Journal of Optical Communications and Networking, 2017, pp. 1-10.

R. A. Wagner and S. E. Dreyfus, "The Steiner Problem in Graphs," Networks 1, Dreyfus and Wagner, pp. 195-207, 1972.

Ramesh Govindan et al., "An Architecture for Stable, Analyzable Internet Routing," IEEE Network, vol. 13, issue 1, pp. 29-35, 1999.

Ryan Shea and Jiangchuan Liu, "Cloud Gaming: Architecture and Performance," IEEE Network, Jul./Aug. 2013, IEEE 2013, pp. 16-21.

Takamichi Nishijima et al., "On the Impact of Network Environment on Remote Desktop Protocols," IEICE Technical Report CQ2012-21 (Jul. 2017), 2012, pp. 23-28 (English Abstract).

Wei Lu et al., "Dynamic Service Provisioning of Advance Reservation Requests in Elastic Optical Networks," Journal of Lightwave Technology, vol. 31, Issue. 10, 2013, pp. 1621-1627.

Y. Liu et al., "The Degree-Constrained Multicasting Algorithm Using Ant Algorithm," Proceedings of the 10th International Conference on Telecommunications, 2003, pp. 370-374.

Yang Chen et al., "Optical Burst Switching: A New Area in Optical Networking Research," IEEE Network, vol. 18, issue 3, pp. 16-23, 2004.

* cited by examiner

|  | FREQUENCY SLOT NUMBER SL1 | FREQUENCY SLOT NUMBER SL2 | FREQUENCY SLOT NUMBER SL3 | FREQUENCY SLOT NUMBER SL4 | FREQUENCY SLOT NUMBER SL5 | FREQUENCY SLOT NUMBER SL6 |
|---|---|---|---|---|---|---|
| TRANSMISSION PATH 3-1 | t0 | t2 | t0 | t0 | t3 | t3 |
| TRANSMISSION PATH 3-2 | t1 | t2 | t0 | t0 | t0 | t0 |
| TRANSMISSION PATH 3-3 | t2 | t0 | t0 | t1 | t1 | t0 |

Fig. 3

| | FREQUENCY SLOT NUMBER SL1 | FREQUENCY SLOT NUMBER SL2 | FREQUENCY SLOT NUMBER SL3 | FREQUENCY SLOT NUMBER SL4 | FREQUENCY SLOT NUMBER SL5 | FREQUENCY SLOT NUMBER SL6 |
|---|---|---|---|---|---|---|
| TRANSMISSION PATH 3-1 | t0 | t2 | t0 | t0 | t3 | t3 |
| TRANSMISSION PATH 3-2 | t1 | t2 | t0 | t0 | t0 | t0 |
| TRANSMISSION PATH 3-3 | t2 | t0 | t0 | t1 | t1 | t0 |

Fig. 7

|  | FREQUENCY SLOT NUMBER SL1 | FREQUENCY SLOT NUMBER SL2 | FREQUENCY SLOT NUMBER SL3 | FREQUENCY SLOT NUMBER SL4 | FREQUENCY SLOT NUMBER SL5 | FREQUENCY SLOT NUMBER SL6 |
|---|---|---|---|---|---|---|
| TRANSMISSION PATH 6-1 | t2 | t2 | t3 | t3 | t3 | t3 |
| TRANSMISSION PATH 6-2 | t2 | t1 | t1 | t2 | t2 | t2 |
| TRANSMISSION PATH 6-3 | t1 | t1 | t1 | t1 | t0 | t0 |
| TRANSMISSION PATH 6-4 | t3 | t2 | t2 | t3 | t3 | t3 |

Fig. 8

OPTICAL PATH DESIGN APPARATUS, OPTICAL PATH DESIGN METHOD AND PROGRAM

CROSS-REFERENCE TO RELATED APPLICATIONS

This application is a National Stage application under 35 U.S.C. § 371 of International Application No. PCT/JP2020/039682, having an International Filing Date of Oct. 22, 2020.

The disclosure of the prior application is considered part of the disclosure of this application, and is incorporated by reference in its entirety into this application.

TECHNICAL FIELD

The present invention relates to an optical path design apparatus, an optical path design method and a program.

BACKGROUND ART

In an optical network in related art, in a case where a demand for an optical path (a route and a frequency of an optical signal) increases as a traffic amount increases, a control device allocates a new optical path to the increased demand. The optical path thus allocated is not released in principle. For example, in a case where a traffic amount increases in an optical network, an already allocated optical path is maintained without being released, and a new optical path is allocated to the increased traffic amount.

On the other hand, there is an optical network design technology intended to dynamically allocate optical paths in response to a changing demand (see Non Patent Literature 1). In such an optical network, a control device releases allocation of an optical path at the end of communication.

FIG. 13 is a view illustrating a configuration example of an optical path design device 100 in related art. The optical path design device 100 includes a storage unit 101, a search unit 102, and a design unit 103.

The storage unit 101 stores topology information on an optical network including one or more transmission paths as links and a plurality of node devices as nodes, and information on optical paths set in the optical network. The search unit 102 searches for route possibilities of an optical signal to be transmitted through an optical path in the optical network on the basis of the topology information. The design unit 103 selects an allocatable optical path from possibilities of an optical path on the basis of information on optical paths (routes and frequencies of optical signals) set for communication devices (not illustrated) of the optical network. In this way, the optical path design device 100 designs an optical path in an optical network.

A control device (not illustrated) generates a control signal including a parameter to be set to a communication device (for example, a node device, a transceiver) of an optical network on the basis of allocation content of the optical path. The control device transmits the control signal to a communication device of the optical network. The communication device reflects the parameter for setting the allocated optical path in operation (for example, relay of an optical signal) of the communication device.

Citation List

Non Patent Literature

Non Patent Literature 1: Bijoy Chand Chatterjee, et al., "Routing and Wavelength Assignment for WDM-based Optical Networks," Springer, pp. 35-43.

SUMMARY OF INVENTION

Technical Problem

FIG. 14 is a flowchart illustrating a design operation example of an optical path design device 100 in related art. The design unit 103 selects an allocatable frequency for one or more routes searched for in the optical network (step S1). The design unit 103 selects a combination (optical path) of a route and a frequency band (step S2). In this way, in an optical network in which an optical path is dynamically designed and set by the optical path design device, a time period required for designing the optical path is very short.

On the other hand, a certain time period is required for a state of a communication device in which a parameter is set to transition to a desired state. For example, it takes about several milliseconds to several seconds from when the communication device receives a parameter for setting an optical path until the parameter is reflected in operation of the communication device. Thus, in a case where the optical path design device designs an optical path, it is necessary to consider a certain time period required for setting the optical path.

In an optical network in related art, a time period required for work other than optical path setting (for example, optical path design, optical path test, and the like) is longer than a time period required for optical path setting (reflection of a parameter in operation). Thus, in an optical network in related art, a time period required for setting an optical path is not taken into account. As described above, in an optical network in related art, there is a problem that the optical path design device cannot design an optical path to satisfy temporal constraints of a demand for the optical path.

In view of the above circumstances, an object of the present invention is to provide an optical path design device, an optical path design method, and a program capable of designing an optical path so as to satisfy temporal constraints of a demand for the optical path.

Solution to Problem

An aspect of the present invention is an optical path design device including: a search unit configured to search for one or more route possibilities from a start point to an end point in an optical network including one or more transmission paths as links and a plurality of node devices as nodes on the basis of topology information of the optical network, information on the start point, and information on the end point; a time derivation unit configured to derive available time which is time at which a frequency band including one or more frequency slots becomes available for communication for each of the transmission paths or the node devices included in the route; and a design unit configured to select the route from the one or more route possibilities that have been searched for on the basis of the available time derived for each of the transmission paths or the node devices and select the frequency band of an optical signal to be transmitted through an optical path in the selected route.

An aspect of the present invention is an optical path design method to be executed by an optical path design device, the method including: a search step of searching for one or more route possibilities from a start point to an end point in an optical network including one or more transmission paths as links and a plurality of node devices as nodes on the basis of topology information of the optical network, information on the start point, and information on the end point; a time derivation step of deriving available time which is time at which a frequency band including one or more frequency slots becomes available for communication for each of the transmission paths or the node devices included in the route; and a design step of selecting the route from the one or more route possibilities that have been searched for on the basis of the available time derived for each of the transmission paths or the node devices and selecting the frequency band of an optical signal to be transmitted through an optical path in the selected route.

According to still another aspect of the present invention, there is provided a program causing a computer to function as the optical path design device.

Advantageous Effects of Invention

According to the present invention, it is possible to design an optical path to satisfy temporal constraints of a demand for the optical path.

BRIEF DESCRIPTION OF DRAWINGS

FIG. 3 is a view illustrating an example of available time of each transmission path of a route in the first embodiment.

FIG. 7 is a view illustrating an example of available time of each transmission path of a route in the second embodiment.

FIG. 8 is a view illustrating an example of available time of each transceiver in the second embodiment.

DESCRIPTION OF EMBODIMENTS

Embodiments of the present invention will be described in detail with reference to the drawings.

First Embodiment

Figure 1:
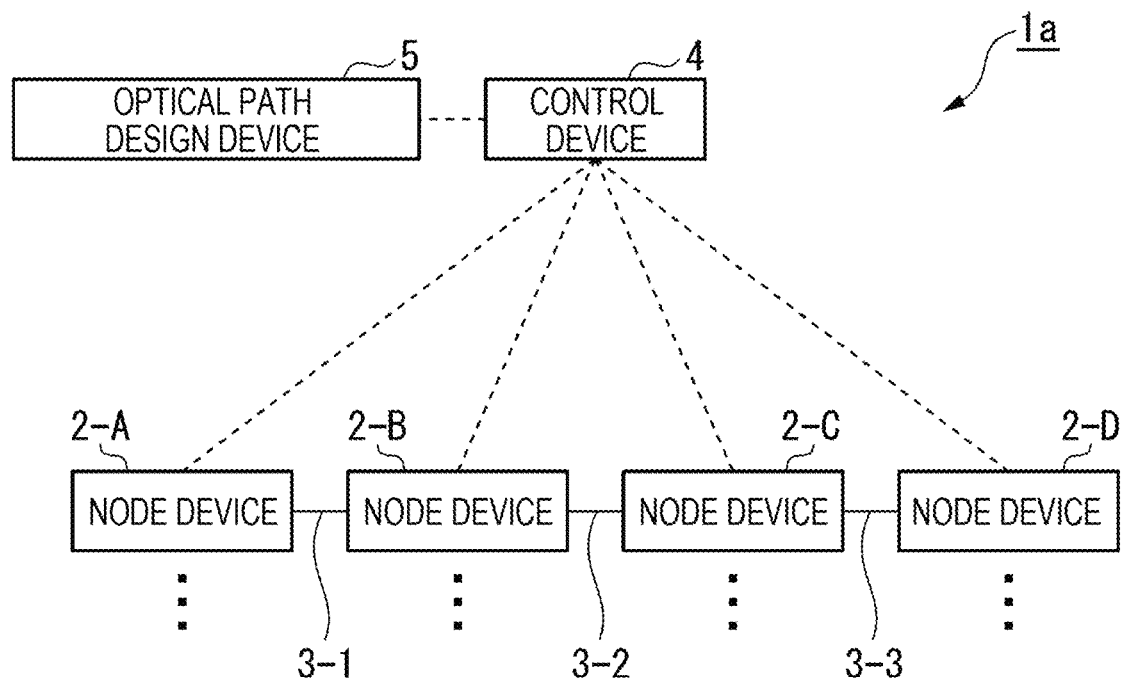
FIG. 1 is a view illustrating a configuration example of a communication system in a first embodiment.

FIG. 1 is a view illustrating a configuration example of a communication system 1a. The communication system 1a includes a plurality of node devices 2, one or more transmission paths 3 (optical fibers) connecting the node devices 2, a control device 4, and an optical path design device 5 (optical path design apparatus). The node device 2 is, for example, a wavelength selective switch (WSS).

A plurality of node devices 2 (optical nodes) and one or more transmission paths 3 (optical links) constitute a route of an optical signal in an optical network. The route can include an optical path for each optical signal having different frequency bands. An optical path through which an optical signal in a predetermined frequency band is to be transmitted is determined according to a parameter set to each node device 2 by the control device 4. In FIG. 1, as an example, a node device 2-A, a transmission path 3-1, a node device 2-B, a transmission path 3-2, a node device 2-C, a transmission path 3-3, and a node device 2-D constitute a route of an optical signal.

In FIG. 1, the node device 2-A is connected to a first end of the transmission path 3-1. The node device 2-B is connected to a second end of the transmission path 3-1. The node device 2-B is connected to a first end of the transmission path 3-2. The node device 2-C is connected to a second end of the transmission path 3-2. The node device 2-C is connected to a first end of the transmission path 3-3. The node device 2-D is connected to a second end of the transmission path 3-3.

In the optical network, each node device 2 relays an optical signal. In FIG. 1, a start point of a route of a main signal in an optical network is, for example, the node device 2-A. An end point of the route of the main signal in the optical network is, for example, the node device 2-D. The optical path (the route and the frequency of the optical signal) designed by the optical path design device 5 is set in each node device 2 by a control signal of the control device 4.

The control device 4 is an optical network management device. In other words, the control device 4 is a device that controls (manages) communication processing of the plurality of node devices 2. The control device 4 acquires demand information of an optical path in the optical network from, for example, the node device 2. The control device 4 generates an allocation request signal according to the demand information of the optical path in the optical network. The control device 4 outputs the allocation request signal to the optical path design device 5.

The demand information includes information on a client device (not illustrated) as a transmission source of a main signal (optical signal), information on a device of a client device (not illustrated) as a reception source of the main signal, and information on a traffic amount (frequency band) required for communication. The demand information may further include information on communication start time and information on communication end time.

The allocation request signal is a signal for requesting allocation (design) of an optical path in response to a demand for the optical path. The allocation request signal includes information on a route (a start point and an end point) of the main signal and information on a frequency band (traffic amount) of the main signal. The allocation request signal may further include information on communication start time and information on communication end time.

The control device 4 acquires allocation content from the optical path design device 5 as a response to the allocation request signal. The control device 4 generates a parameter (for example, information on a route, information on a frequency, information on communication start time, and information on communication end time) on the basis of the allocation content. The control device 4 sets a parameter to each node device 2 using a control signal for setting the parameter. In a case where allocation of the optical path is released, the control device 4 may set the parameter to each node device 2 using a control signal similar to the control signal used to set allocation of the optical path.

Control protocol is, for example, defined as specifications unique to each vendor. The control protocol may be NETCONF (RFC 6241)/RESTCONF (RFC 8040) based on a data model defined by YANG (IETF RFC 7950).

The optical path design device 5 is a device that designs (allocates) an optical path (a route, a frequency, communication start time, communication end time). The optical path design device 5 communicates with the control device 4, for example, when there is a need to exchange information regarding design of the optical path. The optical path design device 5 acquires the allocation request signal from the control device 4. The optical path design device 5 generates allocation content on the basis of the allocation request signal. The optical path design device 5 outputs the allocation content (selection results of the route, the frequency, the communication start time, the communication end time, and the like) to the control device 4.

Figure 2:
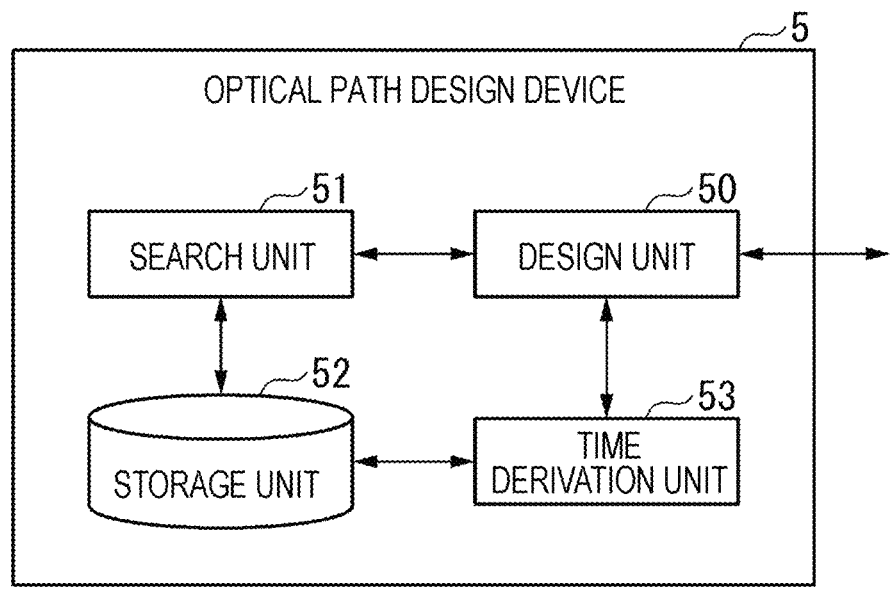
FIG. 2 is a view illustrating a configuration example of an optical path design device in the first embodiment.

FIG. 2 is a view illustrating a configuration example of the optical path design device 5. The optical path design device 5 includes a design unit 50, a search unit 51, a storage unit 52, and a time derivation unit 53.

The design unit 50 acquires the allocation request signal from the control device 4. The design unit 50 controls operation of each functional unit of the optical path design device 5 on the basis of the allocation request signal. The design unit 50 generates information on a start point and information on an end point on the basis of the information on the route of the main signal. The information on the start point is identification information on a start point of the route (node device 2-A). The information on the end point is identification information on an end point of the route (node device 2-D). The design unit 50 outputs the information on the start point and the information on the end point to the search unit 51.

The search unit 51 acquires the information on the start point and the information on the end point from the design unit 50. The search unit 51 acquires topology information of the optical network from the storage unit 52. The search unit 51 searches for one or more route possibilities in the optical network on the basis of the topology information of the optical network, the information on the start point, and the information on the end point. The search unit 51 outputs information on the searched route to the time derivation unit 53. By this means, the search unit 51 requests the time derivation unit 53 for available time information of each transmission path 3. The available time is time at which a frequency band including one or more frequency slots becomes available for communication. The available time may be time at which the frequency band in use is released.

The storage unit 52 stores the topology information of the optical network, device information, and optical path information. The device information includes information on the parameter that has been set for each communication device on the route and information on a time period required for state transition (for example, switching from an optical path of a first frequency band to an optical path of a second frequency band) of each communication device on the route. In FIG. 1, each communication device on the route is each node device 2.

The optical path information is information on an optical path already set in the optical network. The optical path information includes information on a route on which an optical path is set, information on a frequency (frequency band) of the optical path, information on communication start time of the optical path, and information on communication end time of the optical path.

The time derivation unit 53 acquires information on the searched route from the design unit 50. The time derivation unit 53 acquires the device information and the optical path information from the storage unit 52. The time derivation unit 53 derives available time of the searched route in each transmission path 3 on the basis of the device information and the optical path information.

FIG. 3 is a view illustrating an example of available time of each transmission path 3 of the route. In FIG. 3, available time "t0", "t1", or "t2" is determined on the basis of the transmission path 3 and a number of the frequency slot (frequency width) of the optical signal. The available time "t0" indicates current time. The available time "t1" indicates time after the available time "t0". The available time "t2" indicates time after the available time "t1".

The time derivation unit 53 derives available time for each transmission path 3. Note that the time derivation unit 53 may derive the available time for each node device 2.

The available time of the transmission path 3 is determined on the basis of the available time of the first node device 2 connected to a first end of the transmission path 3 and the available time of the second node device 2 connected to a second end of the transmission path 3. For example, the latest time between the available time of the first node device 2 connected to the first end of the transmission path 3 and the available time of the second node device 2 connected to the second end of the transmission path 3 is the available time of the transmission path 3.

In FIG. 3, the available time of the transmission path 3-1 is determined on the basis of the available time of the node device 2-A connected to the first end of the transmission path 3-1 and the available time of the node device 2-B connected to the second end of the transmission path 3-1. For example, for a frequency slot "SL1", the latest time "t0" between the available time of the node device 2-A connected to the first end of the transmission path 3-1 and the available time of the node device 2-B connected to the second end of the transmission path 3-1 is the available time of the transmission path 3-1.

The time derivation unit 53 derives available time for each transmission path 3 in the route. The latest available time among the available time for each transmission path 3 in the route is the available time of a combination of the route and the frequency band.

In FIG. 3, for example, in a case where a frequency slot "SL3" is allocated, the latest time "t0" among the available time "t0" of the transmission path 3-1, the available time "t0" of the transmission path 3-2, and the available time "t0" of the transmission path 3-3 is the available time of a combination of a route from the transmission path 3-1 to the transmission path 3-3 and the frequency slot "SL3".

In FIG. 3, for example, in a case where a frequency slot "SL4" is allocated, the latest time "t1" among the available time "t0" of the transmission path 3-1, the available time "t0" of the transmission path 3-2, and the available time "t1" of the transmission path 3-3 is the available time of a combination of a route from the transmission path 3-1 to the transmission path 3-3 and the frequency slot "SL4".

Thus, for example, in a case where the frequency slots "SL3" and "SL4" are allocated in response to a new demand for requesting allocation, the latest time "t1" is the available time of a combination of a route from the transmission path 3-1 to the transmission path 3-3 and the frequency slots "SL3" and "SL4".

The design unit 50 selects a route and a frequency band such that time from the current time to the available time is the shortest for the route. Communication is performed using a frequency band including one or more frequency slots. In FIG. 3, in a case where two frequency slots (frequency bands) are required in the demand information of the allocation request signal, the design unit 50 selects the frequency slots "SL3" and "SL4". In this case, allocation can be performed at the earliest time "t1".

In FIG. 3, in a case where three frequency slots (frequency bands) are required in the demand information of the allocation request signal, the design unit 50 selects the frequency slots "SL1", "SL2", and "SL3". The design unit 50 may select the frequency slots "SL2", "SL3", and "SL4". In these cases, allocation can be performed at the earliest time "t2".

Next, an operation example of the optical path design device 5 will be described.

Figure 4:
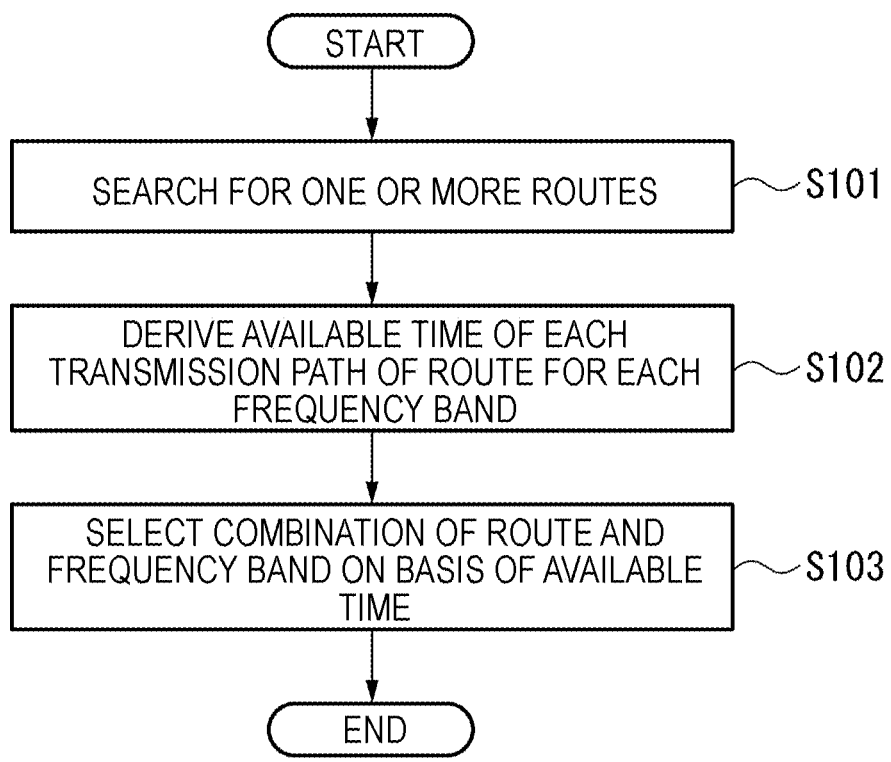
FIG. 4 is a flowchart illustrating an operation example of the optical path design device in the first embodiment.

FIG. 4 is a flowchart illustrating an operation example of the optical path design device 5. The search unit 51 searches for one or more route possibilities in the optical network on the basis of the topology information of the optical network, the information on the start point, and the information on the end point (step S101). The time derivation unit 53 derives available time of each transmission path 3 of the route for each frequency band (step S102). The design unit 50 selects a combination of a route and a frequency band from possibilities determined in advance as a combination of a route and a frequency band on the basis of the available time derived for each frequency band (step S103).

Figure 5:
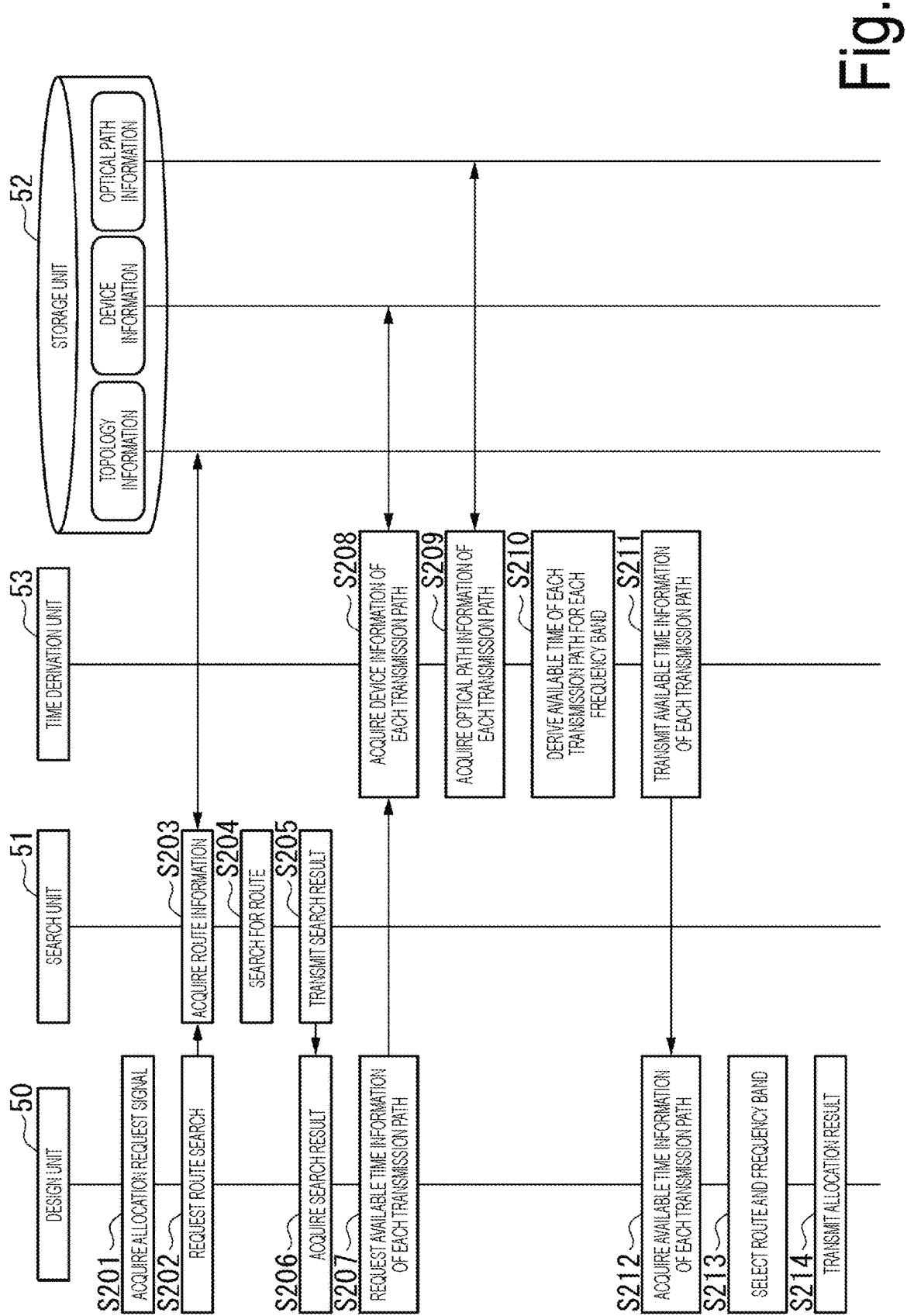
FIG. 5 is a sequence diagram illustrating an operation example of the optical path design device in the first embodiment.

FIG. 5 is a sequence diagram illustrating an operation example of the optical path design device 5. The design unit 50 acquires an allocation request signal from the control device 4 (step S201). The design unit 50 requests the search unit 51 to execute route search (step S202). The search unit 51 acquires topology information from the storage unit 52 (step S203). The search unit 51 searches for one or more route possibilities in the optical network (step S204). The search unit 51 transmits a search result of the route to the design unit 50 (step S205).

The design unit 50 acquires the search result of the route from the search unit 51 (step S206). The design unit 50 requests the time derivation unit 53 for available time information of each transmission path 3 of the route (step S207). The time derivation unit 53 acquires device information of each transmission path 3 of the route from the storage unit 52 (step S208). The time derivation unit 53 acquires optical path information of each transmission path 3 of the route from the storage unit 52 (step S209). The time derivation unit 53 derives available time of each transmission path 3 of the route for each frequency band on the basis of the device information and the optical path information (step S210). The time derivation unit 53 transmits the available time information of each transmission path 3 to the design unit 50 (step S211).

The design unit 50 acquires the available time information of each transmission path 3 from the time derivation unit 53 (step S212). The design unit 50 selects a route and a frequency band as allocation content on the basis of the available time information of each transmission path 3 (step S213). The design unit 50 outputs the allocation content to the control device 4 (step S214).

As described above, the search unit 51 (searcher) searches for one or more route possibilities from the start point to the end point in the optical network on the basis of the topology information of the optical network, the information on the start point, and the information on the end point. The time derivation unit 53 (time derivator) derives available time which is time at which a frequency band including one or more frequency slots becomes available for communication for each of the transmission paths 3 or the node devices 2 included in the route. The design unit 50 (designer) selects a route from the one or more route possibilities that have been searched for on the basis of the available time derived for each of the transmission paths 3 or the node devices 2. The design unit 50 selects a frequency band of an optical signal to be transmitted through the optical path in the selected route.

As a result, it is possible to design an optical path so as to satisfy temporal constraints of a demand for the optical path. It is possible to design an optical path while taking into account a delay until the parameter is reflected in operation after the parameter is set.

Second Embodiment

The second embodiment is different from the first embodiment in that not only available time of a node device but also available time of an optical transceiver (optical transponder) is taken into account. In the second embodiment, differences from the first embodiment will be mainly described.

Figure 6:
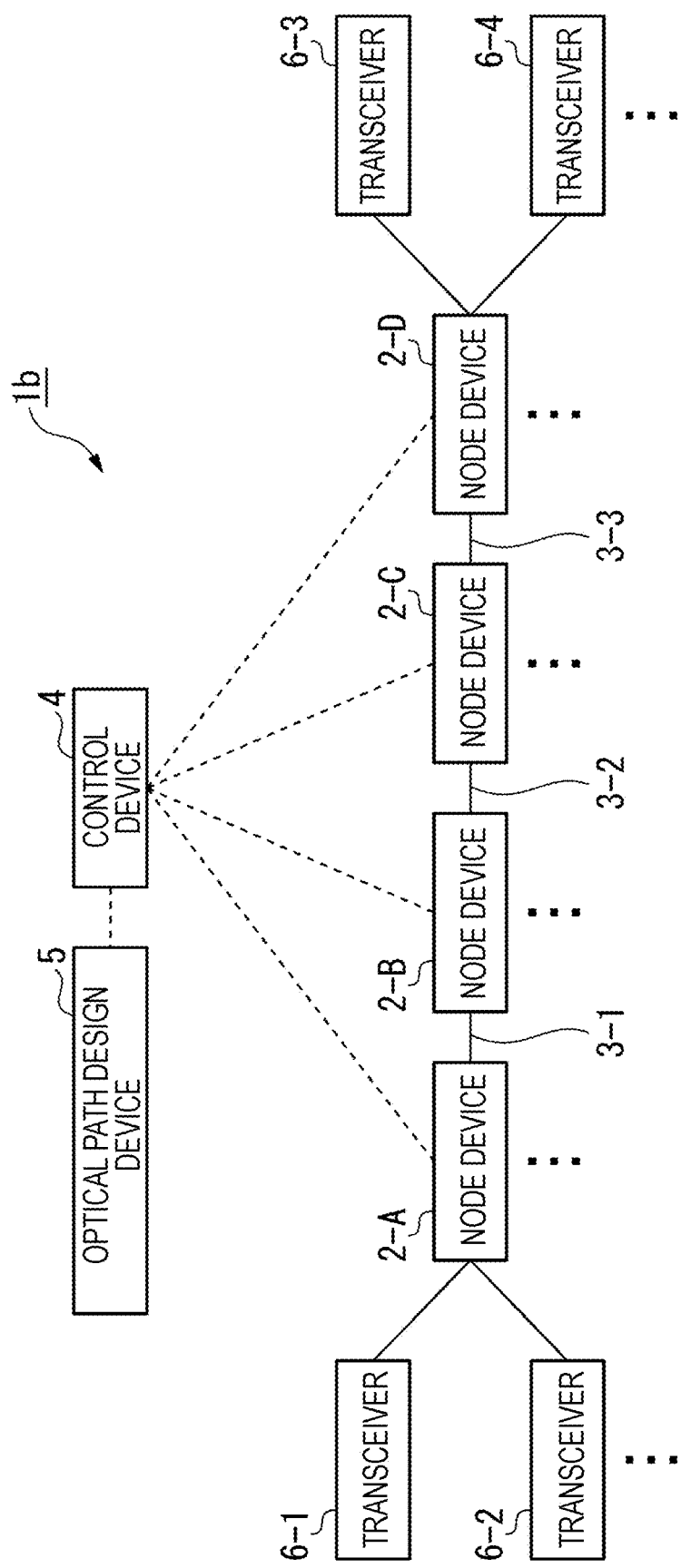
FIG. 6 is a view illustrating a configuration example of a communication system in a second embodiment.

FIG. 6 is a view illustrating a configuration example of a communication system 1b. The communication system 1b includes a plurality of node devices 2, a plurality of transmission paths 3 (optical fibers) connecting the node devices 2, a control device 4, an optical path design device 5, and a plurality of transceivers 6 (transponders).

The transceiver 6 is connected to the node device 2 on a route of an optical signal. In FIG. 6, a transceiver 6-1 and a transceiver 6-2 are connected to a node device 2-A (start point of the route). A transceiver 6-3 and a transceiver 6-4 are connected to a node device 2-D (end point of the route). As a result, an optical path is set between the node device 2-A and the node device 2-D.

The design unit 50 selects a route and a frequency with the shortest time period from current time to available time (optical path setting time) from combinations (possibilities) of the route and the frequency. For example, the design unit 50 selects a route and a frequency at which balance between the route and the available time is the best as allocation content. The route and the frequency that achieve the best balance are, for example, a route and available time that satisfy predetermined conditions. The predetermined conditions include, for example, a condition that a time period from the current time to the available time is the shortest. The predetermined conditions may include, for example, a condition that a value of a cost function (index) determined in advance is equal to or less than a threshold value or falls within a predetermined range. A plurality of predetermined conditions may be combined.

FIG. 7 is a view illustrating an example of available time of each transmission path 3 of the route. The example of the available time illustrated in FIG. 7 is similar to the example of the available time illustrated in FIG. 3. Here, the number of frequency slots required for the optical path newly allocated in response to a demand is one, for example. Available time of the frequency slot "SL3" in each transmission path 3 of the route is the current time "t0".

FIG. 8 is a view illustrating an example of available time of each transceiver 6. In FIG. 8, the transceiver 6-1 is using frequency slots "SL1" and "SL2" until available time "t2". The transceiver 6-1 is using frequency slots "SL3", "SL4", "SL5", and "SL6" until available time "t3". Thus, in order for the transceiver 6-1 to switch the frequency slot in use from the frequency slot "SL1" or "SL2" to the frequency slot "SL3", "SL4", "SL5", or "SL6", it is necessary for the transceiver 6-1 to wait for execution of switching until the available time "t3".

The transceiver 6-2 is using the frequency slots "SL2" and "SL3" until available time "t1". The transceiver 6-2 is using the frequency slots "SL1", "SL4", "SL5", and "SL6" until the available time "t2". Thus, in order for the transceiver 6-2 to switch the frequency slot in use from the frequency slot "SL2" or "SL3" to the frequency slot "SL1", "SL4", "SL5", or "SL6", it is necessary for the transceiver 6-2 to wait for execution of switching until the available time "t2".

In FIG. 8, in a case where one frequency slot (frequency band) is required in the demand information of the allocation request signal, the design unit 50 selects the frequency slot "SL3", the transceiver 6-2, and the transceiver 6-3. In this case, allocation can be performed at the earliest time "t1".

Next, an operation example of the optical path design device 5 will be described.

Figure 9:
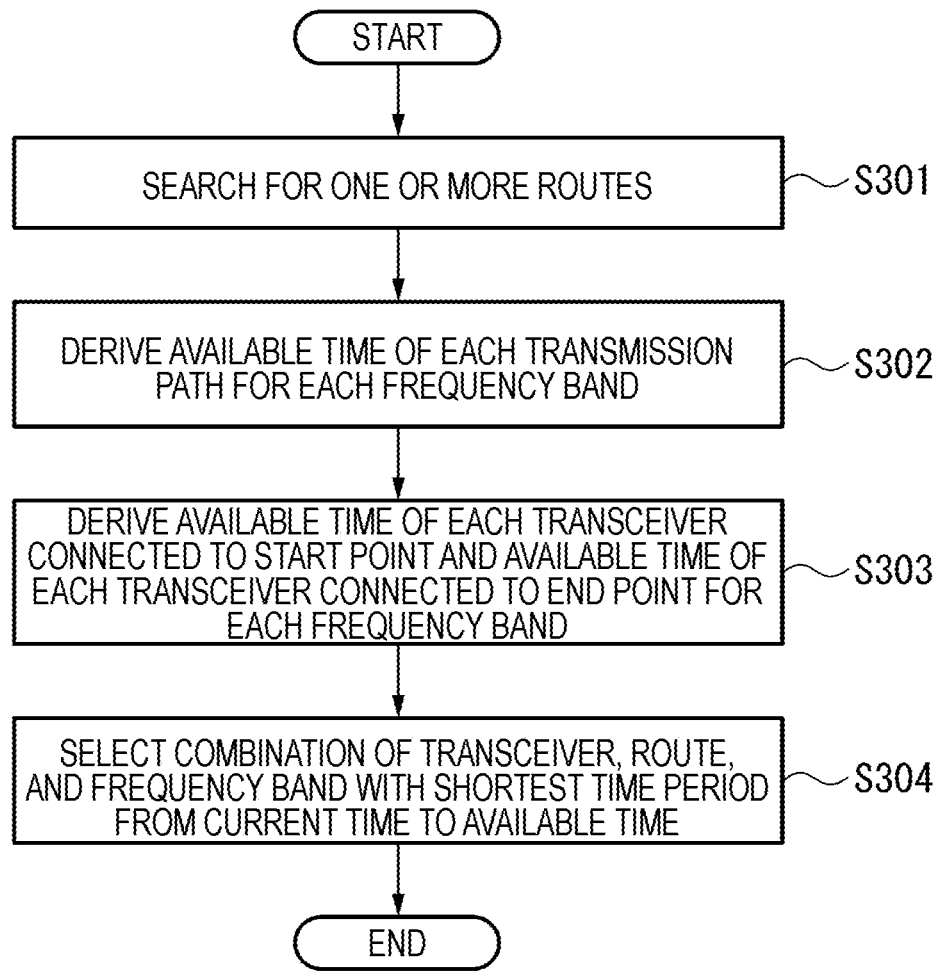
FIG. 9 is a flowchart illustrating an operation example of the optical path design device in the second embodiment.

FIG. 9 is a flowchart illustrating an operation example of the optical path design device 5. The search unit 51 searches for one or more route possibilities in the optical network (step S301). The time derivation unit 53 derives available time of each transmission path 3 of the route for each frequency band (step S302). The design unit 50 derives available time of each transceiver 6 connected to the start point and available time of each transceiver 6 connected to the end point for each frequency band (step S303). A combination of the transceiver 6, the route, and the frequency band with the shortest time period from the current time to the available time is selected (step S304).

Figure 10:
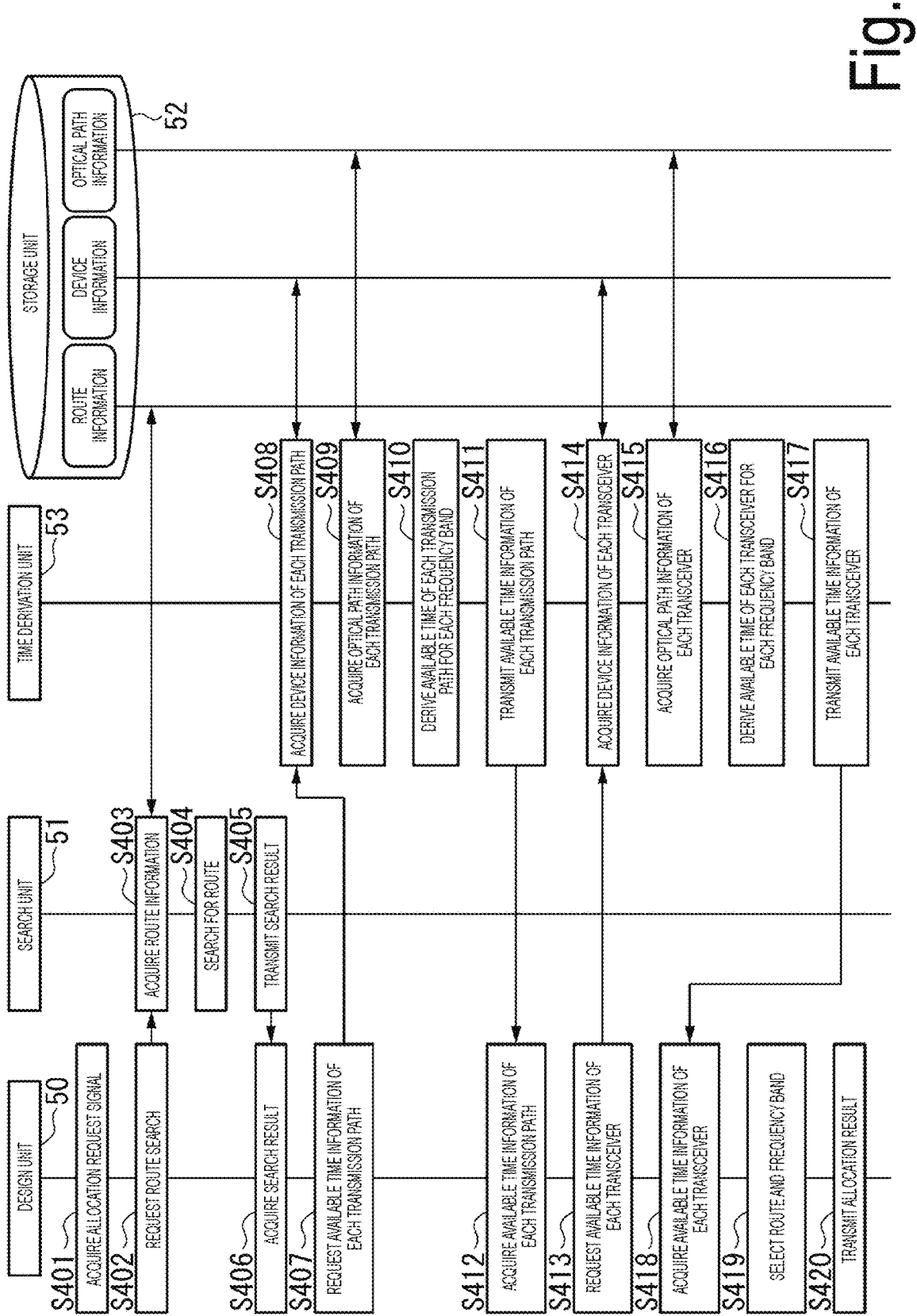
FIG. 10 is a sequence diagram illustrating an operation example of the optical path design device in the second embodiment.

FIG. 10 is a sequence diagram illustrating an operation example of the optical path design device 5. Operation from step S401 to step S412 is similar to the operation from step S201 to step S212 illustrated in FIG. 5.

The design unit 50 requests the time derivation unit 53 for available time information of each transceiver 6 (step S413). The time derivation unit 53 acquires device information of each transceiver 6 from the storage unit 52 (step S414). The time derivation unit 53 acquires optical path information of each transceiver 6 from the storage unit 52 (step S415). The time derivation unit 53 derives available time of each transceiver 6 for each frequency band on the basis of the device information and the optical path information (step S416). The time derivation unit 53 transmits the available time information of each transceiver 6 to the design unit 50 (step S417).

The design unit 50 acquires the available time information of each transceiver 6 from the time derivation unit 53 (step S418). The design unit 50 selects a route and a frequency band as allocation content on the basis of the available time information of each transmission path 3 and the available time information of each transceiver 6 (step S419). The design unit 50 outputs the allocation content to the control device 4 (step S420).

As described above, the time derivation unit 53 derives the available time of the one or more first transceivers 6 connected to the start point and the available time of the one or more second transceivers 6 connected to the end point. The design unit 50 selects a route, a frequency band, the first transceiver 6, and the second transceiver 6 on the basis of the available time of the first transceiver 6, the available time of the second transceiver 6, and the available time for each transmission path 3. The time derivation unit 53 may derive later one of the available time of the first node device 2 connected to a first end of the transmission path 3 and the available time of the second node device 2 connected to a second end of the transmission path 3 as the available time of the transmission path 3.

As a result, even in a case where a time period required for setting the optical path in the optical transceiver (optical transponder) becomes a bottleneck, it is possible to design an optical path so as to satisfy temporal constraints of a demand for the optical path.

Third Embodiment

The third embodiment is different from the first embodiment and the second embodiment in that a setting deadline of an optical path (time designated as temporal constraints) is taken into account. In the third embodiment, differences from the first embodiment and the second embodiment will be mainly described.

Figure 11:
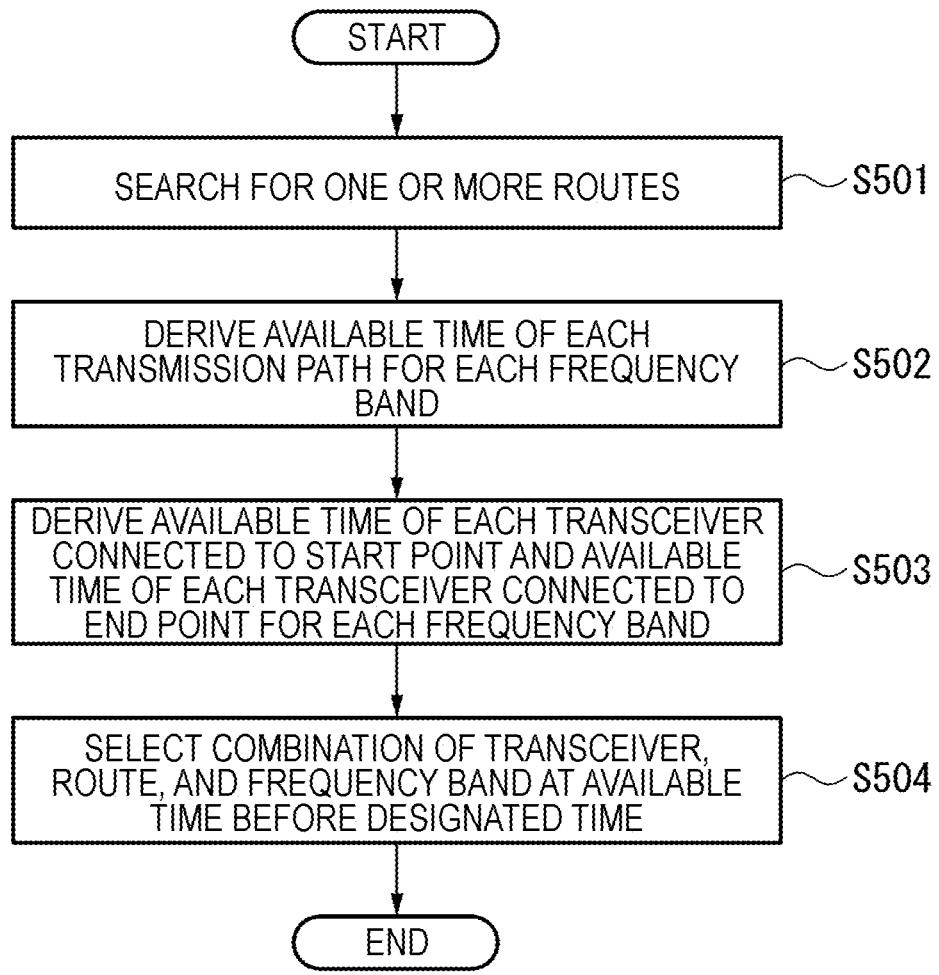
FIG. 11 is a flowchart illustrating an operation example of an optical path design device in a third embodiment.

FIG. 11 is a flowchart illustrating an operation example of the optical path design device 5. Operation from step S501 to step S503 is similar to the operation from step S301 to step S303. The design unit 50 selects a combination of a transceiver 6, a route, and a frequency band at available time before time designated using an allocation request signal as allocation content (step S504). The designated time is determined, for example, on the basis of information on communication start time included in the allocation request signal. For example, the designated time is time before the communication start time.

As described above, the design unit 50 may select a route and a frequency band on the basis of the available time before the designated time. As a result, even in a case where it is desired to complete setting of an optical path by the designated time, it is possible to design an optical path so as to satisfy temporal constraints of a demand for the optical path.

(Modifications)

The design unit 50 may reuse the set parameter. In other words, the design unit 50 determines whether or not a route and a frequency band selected for first communication (demand) on the basis of first available time are available for second communication (demand) after second available time. In a case where it is determined that the route and the frequency band selected for the first communication on the basis of the first available time are available for the second communication after the second available time, the design unit 50 may use the path and the frequency band selected on the basis of the first available time for the second communication after the second available time. As a result, it is possible to design an optical path to satisfy temporal constraints of a demand for the optical path by shortening a time period required for setting the parameter.

Figure 12:
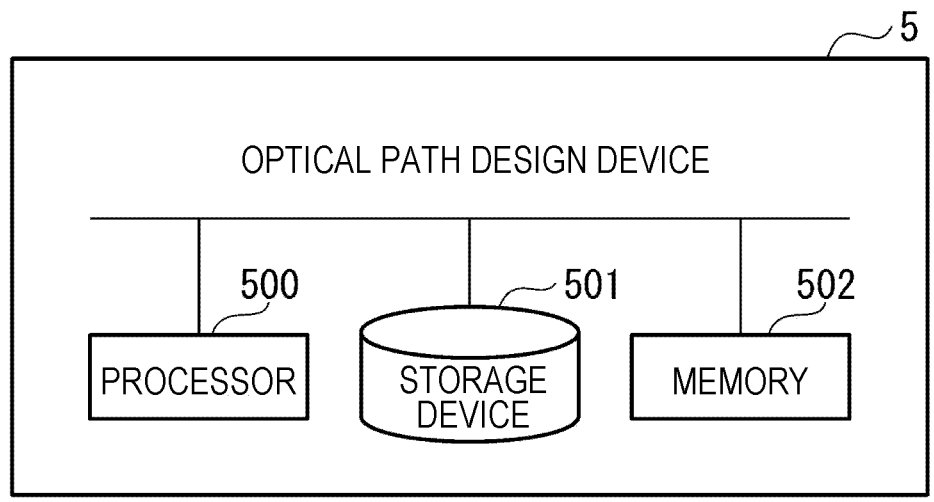
FIG. 12 is a view illustrating a hardware configuration example of the optical path design device in each embodiment.
Figure 13:
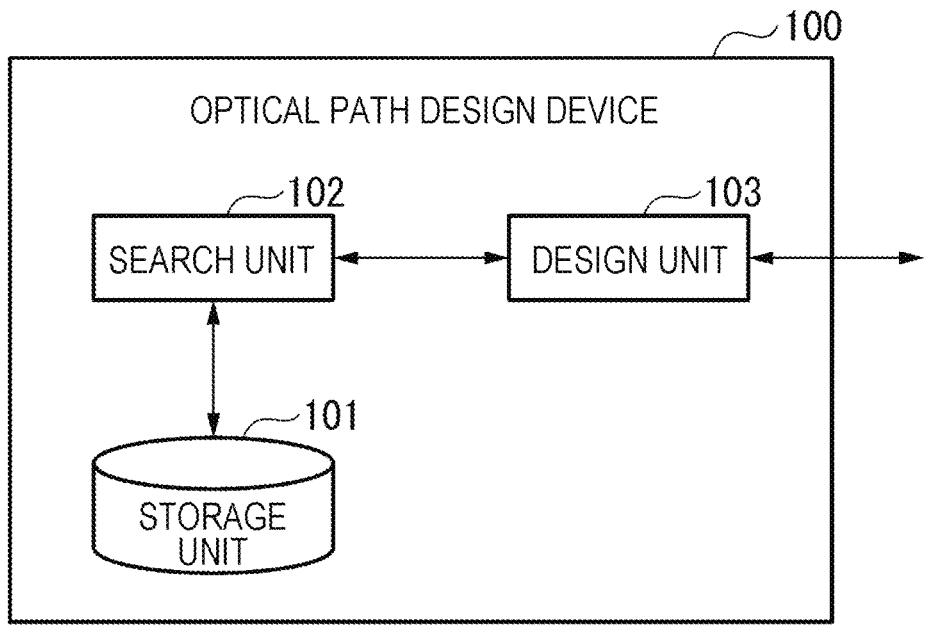
FIG. 13 is a view illustrating a configuration example of an optical path design device in related art.
Figure 14:
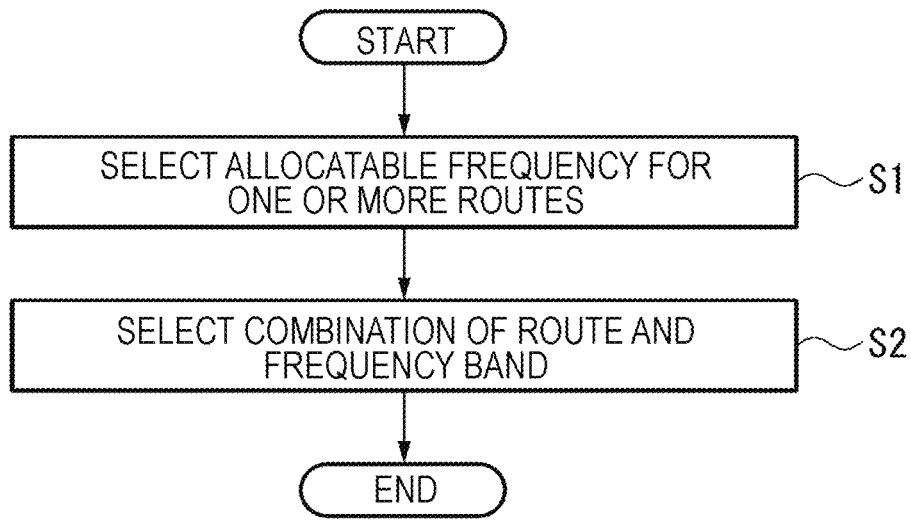
FIG. 14 is a flowchart illustrating a design operation example of the optical path design device in related art.

FIG. 12 is a view illustrating a hardware configuration example of the optical path design device 5 in each embodiment. Some or all of the functional units of the optical path design device 5 are implemented as software by a processor 500 such as a central processing unit (CPU) executing a program stored in a memory 502 including a nonvolatile recording medium (non-transitory recording medium). The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 501 such as a hard disk built in a computer system. Some or all of the functional units of the optical path design device 5 may be implemented by using hardware including an electronic circuit (electronic circuit or circuitry) using, for example, a large scale integrated circuit (LSI), an application specific integrated circuit (ASIC), a programmable logic device (PLD), a field programmable gate array (FPGA), or the like.

Although the embodiments of the present invention have been described in detail with reference to the drawings, a specific configuration is not limited to the embodiments and includes design, and the like, within a range not departing from the gist of the present invention.

INDUSTRIAL APPLICABILITY

The present invention is applicable to a communication system of an optical network.

REFERENCE SIGNS LIST 1a, 1b Communication system
2 Node device
3 Transmission path
4 Control device
5 Optical path design device
50 Design unit
51 Search unit
52 Storage unit
53 Time derivation unit
100 Optical path design device
101 Storage unit
102 Search unit
103 Design unit
500 Processor
501 Storage device
502 Memory

The invention claimed is:

1. An optical path design device comprising:
a searcher, including one or more processors, configured to search for one or more route possibilities from a start point to an end point in an optical network including one or more transmission paths as links and a plurality of node devices as nodes on a basis of topology information of the optical network, information on the start point, and information on the end point;
a time derivator, including one or more processors, configured to derive available time which is time at which a frequency band including one or more frequency slots becomes available for communication for each of the transmission paths or the node devices included in the route; and
a designer, including one or more processors, configured to select the route from the one or more route possibilities that have been searched for on a basis of the available time derived for each of the transmission paths or the node devices and select the frequency band of an optical signal to be transmitted through an optical path in the selected route.

2. The optical path design device according to claim 1, wherein the time derivator is configured to derive the available time of one or more first transceivers connected to the start point and the available time of one or more second transceivers connected to the end point, and the designer is configured to select the route, the frequency band, the first transceiver, and the second transceiver on a basis of the available time of the first transceiver, the available time of the second transceiver, and the available time for each of the transmission paths.

3. The optical path design device according to claim 1, wherein the time derivator is configured to derive later one of the available time of a first node device connected to a first end of each of the transmission paths and the available time of a second node device connected to a second end of each of the transmission paths as the available time of each of the transmission paths.

4. The optical path design device according to claim 1, wherein the designer is configured to select the route and the frequency band such that a time period from current time to the available time becomes shortest for the route.

5. The optical path design device according to claim 1, wherein the designer is configured to select the route and the frequency band on a basis of the available time before designated time.

6. The optical path design device according to claim 1, wherein in a case where the route and the frequency band selected for first communication on a basis of first available time are available for second communication after second available time, the designer is configured to cause the route and the frequency band selected on a basis of the first available time to be used for the second communication after the second available time.

7. An optical path design method executed by an optical path design device, the optical path design method comprising:
searching for one or more route possibilities from a start point to an end point in an optical network including one or more transmission paths as links and a plurality of node devices as nodes on a basis of topology information of the optical network, information on the start point, and information on the end point;
deriving available time which is time at which a frequency band including one or more frequency slots becomes available for communication for each of the transmission paths or the node devices included in the route; and
selecting the route from the one or more route possibilities that have been searched for on a basis of the available time derived for each of the transmission paths or the node devices and selecting the frequency band of an optical signal to be transmitted through an optical path in the selected route.

8. The optical path design method of claim 7, further comprising:
deriving the available time of one or more first transceivers connected to the start point and the available time of one or more second transceivers connected to the end point; and
selecting the route, the frequency band, the first transceiver, and the second transceiver on a basis of the available time of the first transceiver, the available time of the second transceiver, and the available time for each of the transmission paths.

9. The optical path design method of claim 7, further comprising:
   deriving later one of the available time of a first node device connected to a first end of each of the transmission paths and the available time of a second node device connected to a second end of each of the transmission paths as the available time of each of the transmission paths.

10. The optical path design method of claim 7, further comprising:
   selecting the route and the frequency band such that a time period from current time to the available time becomes shortest for the route.

11. The optical path design method of claim 7, further comprising:
   selecting the route and the frequency band on a basis of the available time before designated time.

12. The optical path design method of claim 7, further comprising:
   wherein in a case where the route and the frequency band selected for first communication on a basis of first available time are available for second communication after second available time, causing the route and the frequency band selected on a basis of the first available time to be used for the second communication after the second available time.

13. A non-transitory computer readable medium storing a program for causing a computer to perform operations comprising:
   searching for one or more route possibilities from a start point to an end point in an optical network including one or more transmission paths as links and a plurality of node devices as nodes on a basis of topology information of the optical network, information on the start point, and information on the end point;
   deriving available time which is time at which a frequency band including one or more frequency slots becomes available for communication for each of the transmission paths or the node devices included in the route; and
   selecting the route from the one or more route possibilities that have been searched for on a basis of the available time derived for each of the transmission paths or the node devices and selecting the frequency band of an optical signal to be transmitted through an optical path in the selected route.

14. The non-transitory computer readable medium according to claim 8, wherein the operations further comprise:
   deriving the available time of one or more first transceivers connected to the start point and the available time of one or more second transceivers connected to the end point; and
   selecting the route, the frequency band, the first transceiver, and the second transceiver on a basis of the available time of the first transceiver, the available time of the second transceiver, and the available time for each of the transmission paths.

15. The non-transitory computer readable medium according to claim 8, wherein the operations further comprise:
   deriving later one of the available time of a first node device connected to a first end of each of the transmission paths and the available time of a second node device connected to a second end of each of the transmission paths as the available time of each of the transmission paths.

16. The non-transitory computer readable medium according to claim 8, wherein the operations further comprise:
   selecting the route and the frequency band such that a time period from current time to the available time becomes shortest for the route.

17. The non-transitory computer readable medium according to claim 8, wherein the operations further comprise:
   selecting the route and the frequency band on a basis of the available time before designated time.

18. The non-transitory computer readable medium according to claim 8, wherein the operations further comprise:
   wherein in a case where the route and the frequency band selected for first communication on a basis of first available time are available for second communication after second available time, causing the route and the frequency band selected on a basis of the first available time to be used for the second communication after the second available time.

* * * * *